UNITED STATES PATENT OFFICE.

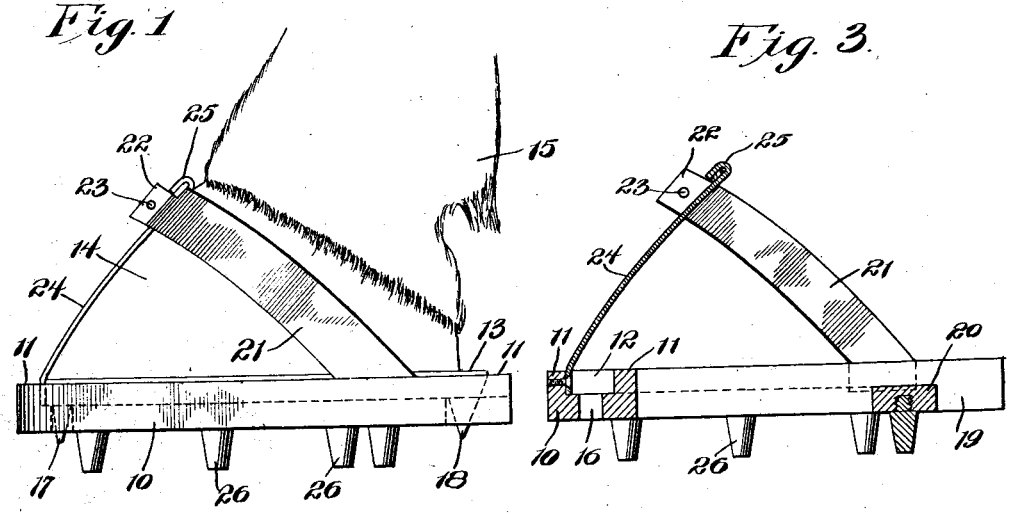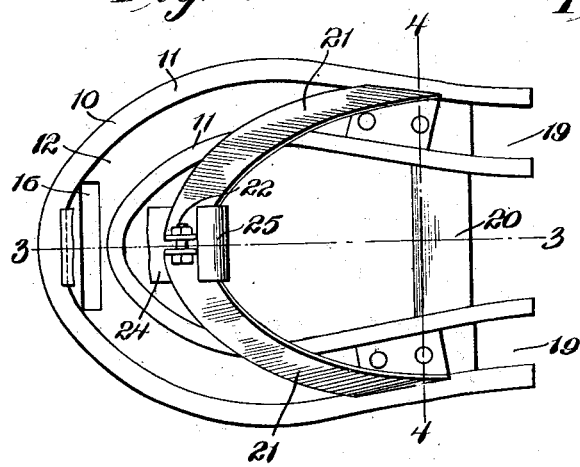

FRANK P. DYER, OF ST. LOUIS, MISSOURI.

OVERSHOE FOR HORSES.

1,070,881.  Specification of Letters Patent.  Patented Aug. 19, 1913.

Application filed April 1, 1912. Serial No. 687,704.

*To all whom it may concern:*

Be it known that, I, FRANK P. DYER, a citizen of the United States, residing at St. Louis, in the State of Missouri, have invented new and useful Improvements in Overshoes for Horses, of which the following is a specification.

An object of the invention is to provide an overshoe for connection with the hoofs and shoes of draft animals.

The invention embodies, among other features, an overshoe that can be easily and quickly mounted in rigid position on the shoes and hoofs of the animal and which will prevent the animal from slipping on slippery surfaces and icy pavements.

In the further disclosure of the invention reference is to be had to the accompanying drawings constituting a part of this specification, in which similar characters of reference denote corresponding parts in all the views, and in which:

Figure 1 is a side elevation of my device showing the same in applied position; Fig. 2 is a plan view of the device, the straps being broken away to disclose the underlying structure; Fig. 3 is a vertical sectional view taken on the line 3—3 in Fig. 2; and Fig. 4 is a vertical sectional view taken on the line 4—4 in Fig. 3.

Referring more particularly to the views, use is made of a shoe body 10 provided with upwardly extending flanges 11, the said flanges being spaced apart to form a channel 12 adapted to receive a shoe 13 secured to the hoof 14 of a horse 15, an opening 16 being provided at the front end of the shoe body 10, in the channeled portion 12, to receive the front calk 17 of the horse shoe 13, the usual rear calks 18 of the horse shoe 13 being adapted to repose in grooves 19 formed at the ends of the shoe body 10, the mentioned ends of the shoe body being connected by a crosspiece 20. Side straps 21 have the lower ends thereof secured to the shoe body 10, the mentioned ends being preferably countersunk in the shoe body, the said straps extending upwardly and terminating in flanges 22 having passed therethrough a bolt 23 adapted to relatively lock the free ends of the side straps 21, a strap 24 being rigidly secured to the front end of the shoe body and preferably countersunk therein, the said strap 24 being extended upwardly and rearwardly and terminating in a retaining member 25 adapted to engage the side straps 21 at their point of connection. A series of calks 26 are mounted on the under side of the shoe body 10, said calks being arranged to depend from the shoe body and preferably of a frusto-conical shape, one of the said calks being mounted to depend from the crosspiece 20 to aid in properly supporting the shoe body so that when a draft animal is supplied with a set of overshoes described herein, the animal will be able to firmly stand upon a slippery surface or icy pavement without fear of slipping or falling.

One manner of applying the overshoe to the hoof 14 of the horse 15 is to loosen the side straps 21 by disengaging the bolt 23 therefrom and also disengaging the strap 24 from the side straps 21, after which the overshoe is placed upon the hoof with the front calk of the horse shoe extending into the opening 16 and the rear calks of the horse shoe extending into the grooves 19, the body of the horse shoe being arranged in the channel 12 of the shoe body and between the flanges 11 thereof. The bolt 23 is now arranged to connect and lock the flanges 22 of the side straps 21 and the retaining member 25 of the strap 24 is then engaged with the straps 21 at their point of connection, thus not only retaining the shoe body on the hoof of the horse, but also retaining the side straps in position on the hoof, it being readily understood that the position of the horse shoe 13 on the shoe body 10, together with the arrangement of the side straps 21 and the strap 24, will retain the overshoe described in rigid position on the hoof 14 of the horse 15. If desirable, the calks 26 can be threadedly mounted on the shoe body 10 and can then be easily removed when the same have become worn, for the purpose of resharpening or supplying new calks for the shoe body.

Having thus described my invention, I claim:

In an overshoe, the combination with a shoe body provided with a channel in the upper face thereof, of side straps having their lower ends bent laterally and reposing in seats in the said channel, with the upper faces of the lower ends of the side straps lying flush with the bottom of the channel, the said side straps being extended upwardly and forwardly from adjacent the rear ends of the shoe body, similar opposed flanges formed on the free ends of the side straps, a bolt passing transversely through the said flanges to adjustably connect the side straps at their free ends, a front strap having the lower end thereof secured in the said channel and projecting upwardly and rearwardly, and a hook-like retaining member formed on the upper free end of the front strap and passing beneath the forward ends of the side straps to overlap the edges of the side straps at their point of connection, the overlapping of the said hook-like retaining member being limited by the flanges on the free ends of the side straps, fastening members passing transversely through the lower bent ends of the side straps and through the shoe body to secure the lower ends of the side straps rigidly in the said channel, and a fastening member passing horizontally through a wall of the channel at the front end of the shoe body to secure the lower end of the front strap rigidly in the channel.

In testimony whereof I affix my signature in presence of two witnesses.

FRANK P. DYER.

Witnesses:
GEORGE E. MIX,
CLARA S. KIEHL.

Copies of this patent may be obtained for five cents each, by addressing the "Commissioner of Patents, Washington, D. C."